United States Patent
Heurguier

(10) Patent No.: US 11,435,431 B2
(45) Date of Patent: Sep. 6, 2022

(54) METHOD FOR COLLABORATIVE GEOLOCATION IN A NEIGHBOURHOOD

(71) Applicant: THALES, Courbevoie (FR)

(72) Inventor: Dominique Heurguier, Gennevilliers (FR)

(73) Assignee: THALES, Courbevoie (FR)

( * ) Notice: Subject to any disclaimer, the term of this patent is extended or adjusted under 35 U.S.C. 154(b) by 843 days.

(21) Appl. No.: 16/328,265

(22) PCT Filed: Aug. 31, 2017

(86) PCT No.: PCT/EP2017/071857
§ 371 (c)(1),
(2) Date: Feb. 25, 2019

(87) PCT Pub. No.: WO2018/041941
PCT Pub. Date: Mar. 8, 2018

(65) Prior Publication Data
US 2019/0204407 A1    Jul. 4, 2019

(30) Foreign Application Priority Data

Sep. 1, 2016 (FR) ...................................... 1601292

(51) Int. Cl.
*G01S 5/02* (2010.01)
*H04W 64/00* (2009.01)
*H04W 4/02* (2018.01)

(52) U.S. Cl.
CPC .......... *G01S 5/0289* (2013.01); *H04W 4/023* (2013.01); *H04W 64/00* (2013.01); *H04W 64/003* (2013.01)

(58) Field of Classification Search
CPC ........ G01S 5/0289; H04W 4/02; H04W 64/00
(Continued)

(56) References Cited

U.S. PATENT DOCUMENTS

| 11,076,051 B1 * | 7/2021 | Miskovic ............ H04M 7/0075 |
| 2011/0291882 A1 * | 12/2011 | Walsh ..................... G01S 19/46 |
| | | 342/464 |

(Continued)

FOREIGN PATENT DOCUMENTS

| CA | 2374845 C * | 8/2008 | ............. H04L 45/00 |
| WO | 2010/028278 A2 | 3/2010 | |

(Continued)

OTHER PUBLICATIONS

Heurtefeux, et al., "Localisation collaborative pour rëseaux de capteurs", HAL Id: hal-00250241, https://hal.archives-ouvertes.fr/hal-00250241.

(Continued)

*Primary Examiner* — Harry K Liu
(74) *Attorney, Agent, or Firm* — BakerHostetler

(57) ABSTRACT

A method and a device for collaborative geolocation of one or more nodes Mi in a communication network are provided, the nodes inter-exchanging distance and/or position information, comprising at least the following steps determine a first sub-graph $V_1$ of neighbor nodes of a current node A to be geolocated, in N hops, select in the first sub-graph $V_1$, the largest observable sub-graph $V_3$, execute a geolocation algorithm on the nodes of the largest observable sub-graph $V_3$ and determine at least the position of the current node A. An ad-hoc communication network is also provided.

10 Claims, 4 Drawing Sheets

(58) Field of Classification Search
USPC .......................................................... 342/463
See application file for complete search history.

(56) References Cited

U.S. PATENT DOCUMENTS

2013/0031033 A1\* 1/2013 Prieditis ................ H04L 61/609
  706/12
2022/0014462 A1\* 1/2022 Feng ........................ H04W 4/46

FOREIGN PATENT DOCUMENTS

WO    WO-2010107440 A1 \*   9/2010   ............. G01D 21/00
WO    WO-2014028154 A1 \*   2/2014   ............. H04L 45/00

OTHER PUBLICATIONS

Jia, et al., "On the optimal performance of collaborative position location", IEEE Transactions on Wireless Communications, vol. 9, Issue: 1, pp. 374-383, Jan. 1, 2010.
Yick, et al., "Wireless sensor network survey", Computer Networks, vol. 52, Issue 12, pp. 2292-2330, Aug. 22, 2008.

\* cited by examiner

METHOD FOR COLLABORATIVE GEOLOCATION IN A NEIGHBOURHOOD

CROSS-REFERENCE TO RELATED APPLICATIONS

This application is a National Stage of International patent application PCT/EP2017/071857, filed on Aug. 31, 2017, which claims priority to foreign French patent application No. FR 1601292, filed on Sep. 1, 2016, the disclosures of which are incorporated by reference in their entirety.

FIELD OF THE INVENTION

The invention relates to a method of group-wise collaborative geolocation, involving several nodes in a communication network. In the method according to the invention, the nodes inter-exchange distance and/or position information, for example, or other parameters useful for geolocation, so that a higher-performance navigation system is made available.

The nodes may be mobile nodes which change position in the radiocommunication network (for example pedestrians or networked vehicles).

BACKGROUND

The management of information exchanges in the case of collaborative navigation becomes a problem when the number of nodes present in a communication network is significant, typically above a few tens of nodes. In this case, certain nodes may be situated more than about ten hops apart, thereby posing at one and the same time problems of congestion and of timescale in forwarding the information, when each node must broadcast its information to all the other nodes of the network. The solutions known from the prior art which entail global calculation of geolocation are faced both with a large combinatorial problem (significant amount of information to be taken into account in the calculation) induced by large-size networks and also with the difficulty of recovering, in a limited time, information coming from all the nodes (limitation of the exchange protocols, as mentioned hereinabove, to repatriate to each node all the information of the other nodes in constrained timescales). This generally makes it very difficult, or indeed impossible, to calculate a global solution in constrained time and, ultimately, to calculate a solution that can be revised easily and reupdated as a function of the geolocation cycle time. The geolocation cycle is, for example, defined by trigger instants of the geolocation method.

The measurements of distance between neighbors can be obtained by measurements on the waveform of the radiocommunication network or by a complementary item of equipment. In the latter case, the oriented graph of inter-node telemetry is defined by forming an edge (i,j) if node i delivers a measurement of distance of node j. Hereinafter, unless stated to the contrary, the terms graph or network will refer only to the telemetry graph, which coincides with the graph of the communication network in the case where telemetry measurements are carried out on the radio links.

The prior art also describes procedures for local geolocation which comprise a calculation of positioning of a node to be geolocated by utilizing the direct neighbors of the node (of the telemetry graph) which themselves have at their disposal an estimation of their position. This solution works only if at least three neighbor nodes have a position estimation for themselves at their disposal. Moreover, it is fairly imprecise when the number of neighbors is small.

In the case where there are not at least three nodes having a position estimation, an extension of this solution consists, for example, in repeating the geolocation process on the basis of the neighbors, i.e., by trying again to obtain a geolocation of the current node at the next cycle, which will be possible if at least three neighbor nodes succeed in self-geolocating. However, such a solution does not always make it possible to find geolocation solutions in situations which are nevertheless observable, notably if no node of the network has at least three geolocated neighbors. This remains true in the case where geolocation solutions are obtained, the latter generally being fairly imprecise and insufficiently revised in the presence of mobile nodes.

FIG. 1 illustrates a network with a node to be geolocated A, several nodes 2 having at their disposal a position estimation, several nodes 3 without position estimation. All the nodes communicate with one another through communication means and a communication protocol known to the person skilled in the art. This solution is valid if all the nodes are observable. However, it has the drawback of requiring significant calculation time to estimate a position. A node is termed "observable", if the latter is capable of estimating its data in respect of position within the network. The degree of observability $D_n$ of a node n is also defined as being the number of hops required for it to be able to self-geolocate within the neighborhood sub-network in $D_n$ hops of the node n, with by convention a zero degree of observability, if the node already has its own position estimation at its disposal. This position estimation can be obtained, for example with the aid of a GPS sensor by tracking.

FIG. 2 illustrates the case where the geolocation of the current node A is impossible with a conventional approach in direct neighborhood, since the method does not have at its disposal at least three neighbor nodes having a position estimation. FIG. 2 shows diagrammatically a perimeter 20 containing the node to be geolocated A, two neighbor nodes 21, 22 having a position estimation at their disposal and a neighbor node 23 not having a position estimation at its disposal and which does not contribute to the geolocation of the node A. This case does not therefore make it possible to geolocate the node A.

The document entitled "Localisation collaborative pour réseaux de capteurs" [Collaborative location for networks of sensors] by Karel Heurtefeux and Fabrice Valois, HAL Id: hal-00250241, https://hal.archives-ouvertes.fr/hal-00250241, discloses an algorithm for local location which uses only the knowledge of the radio topology and does not call upon ranging measurements or GPS measurements.

SUMMARY OF THE INVENTION

The method according to the invention relies on a new approach which consists, notably, in determining an observable neighborhood and thereafter in conducting geolocation steps while utilizing the available ranging and position measurements.

The observable neighborhood for a node to be geolocated is defined as a set of nodes containing the node to be geolocated, these nodes themselves being observable, that is to say:

that these nodes are capable of estimating their own position in a unique manner or that they already have a geolocation at their disposal, that these nodes communicate with the node to be geolocated by broadcasting position and/or ranging information which can be used to geolocate the node A. The geolocation of the node A is all the more precise the more significant the number of measurements and of nodes of this neighborhood.

Note that the geolocation of the node A involves at the level of the processing of the node A, the geolocation of the whole set of nodes of the neighborhood.

The invention relates to a method of collaborative geolocation of one or more nodes Mi in a communication network, the nodes inter-exchanging at least distance and/or position information, comprising at least the following steps:
  Determine a first sub-graph $V_1$ of neighbor nodes of a current node A to be geolocated, in N hops,
  Select in said first sub-graph $V_1$, the largest observable sub-graph $V_3$, composed of a set of nodes adapted to estimate their own position in a unique manner, said nodes communicating with the node to be geocalized by broadcasting position and/or ranging information so as to geolocate a node,
  Execute a geolocation algorithm on the nodes of the largest observable sub-graph $V_3$ and determine at least the position of the current node A.

According to a variant, the geolocation method is characterized in that it comprises at least the following steps:
  Determine a first sub-graph $V_1$ of the neighbor nodes of the current node A by considering the nodes in N hops maximum with N greater than or equal to zero, and then
  Determine the largest observable sub-graph $V_3$ on the basis of the first sub-graph of the neighbors $V_1$ containing the node A, by executing the following steps:
    Determine whether there exist at least three nodes belonging to the first sub-graph $V_1$ and having a position estimation at their disposal,
    If there do not exist at least three nodes belonging to the first sub-graph $V_1$ and having a position estimation at their disposal, then there is no observable neighborhood of the node A included in the first sub-graph $V_1$ and the node A is not locatable,
    If there are at least three nodes belonging to the first sub-graph $V_1$ with position estimation, then, construct a second sub-graph $V_2$, by eliminating from the first sub-graph $V_1$ the nodes which are different from the node A, which do not contain any position estimation and which have a number less than or equal to 2 of edges departing from the node,
  Test whether the second sub-graph $V_2$ is observable, if such is the case the largest sub-graph $V_3$ is defined as being the second sub-graph $V_2$,
  Otherwise, traverse the sub-graphs of $V_2$ containing the node A,
  Execute a geolocation algorithm on the nodes contained in the largest sub-graph $V_3$ existing, so as to determine the position of the current node A.

The observability test of a sub-graph can implement a global-rigidity test.
  The global-rigidity test can comprise the following steps:
  Verify that a sub-graph remains connected when any two vertices are removed,
  Verify that a sub-graph remains rigid on removing any edge.

The method applies, for example, in a decentralized communication network for determining the position of the nodes of said network.

The invention also relates to a device for geolocating one or more nodes in a network, the nodes being equipped with senders-receivers and with communication means, characterized in that each of the nodes comprises at least the following elements:
  A processor adapted to execute the steps of the method according to the invention,
  A device allowing a node to self-geolocate,
  A table storing the topology information in respect of the other nodes.

The invention applies in an ad-hoc communication network.

BRIEF DESCRIPTION OF THE DRAWINGS

Other characteristics and advantages of the present invention will become better apparent on reading the description which follows, of exemplary embodiments given by way of wholly nonlimiting illustration, together with the appended figures which represent.

DETAILED DESCRIPTION

Figure 1:
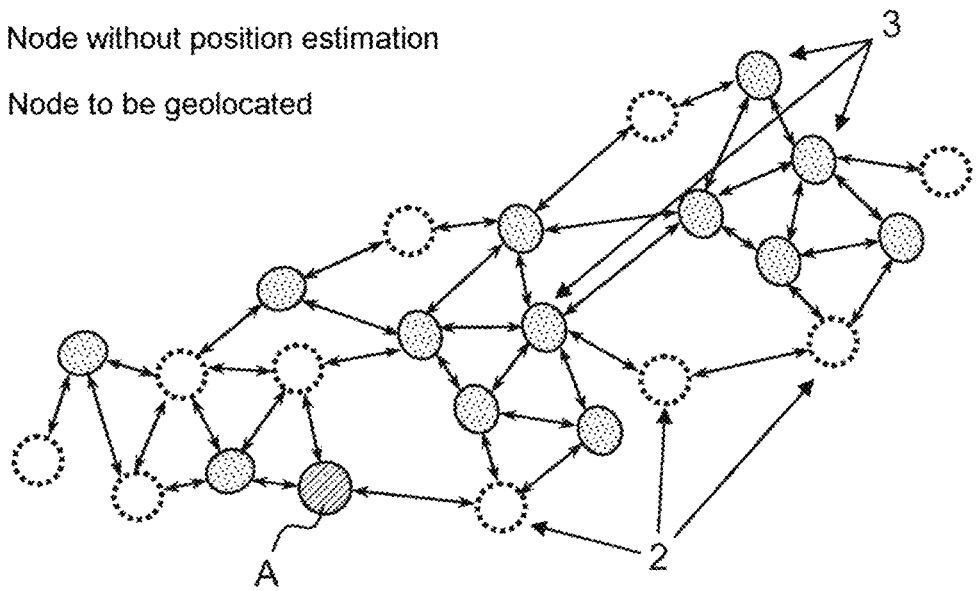
FIG. 1, a first exemplary telemetry network architecture according to the prior art and FIG. 2, a second exemplary architecture according to the prior art, FIG. 3, an illustration of the definition of an observable node in a network, FIG. 4, an illustration of the elements and of the modules with which the nodes of a network are equipped for the implementation of the method according to the invention, FIG. 5, an illustration of the subsets of nodes obtained by the method according to the invention, and FIG. 6, a flowchart describing an example of steps implemented by the method.
Figure 2:
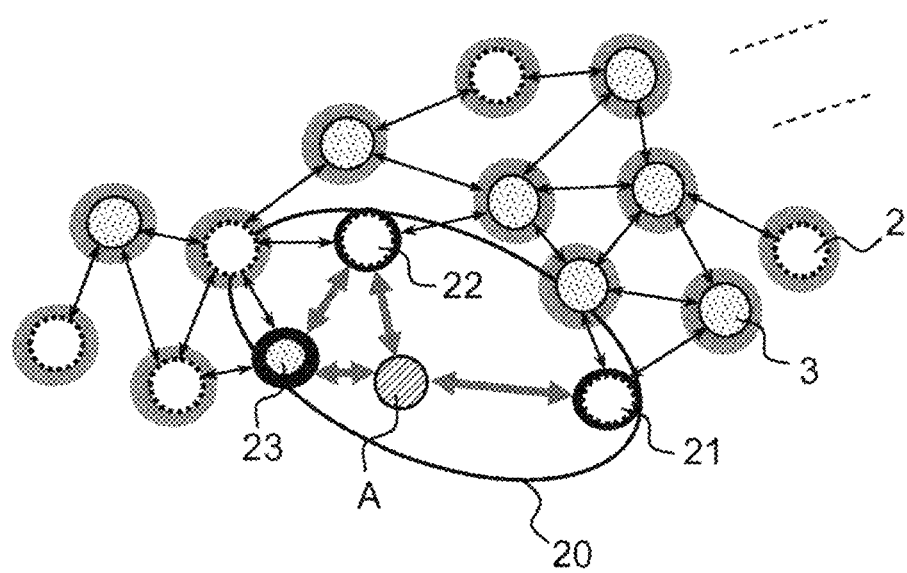
Figure 3:
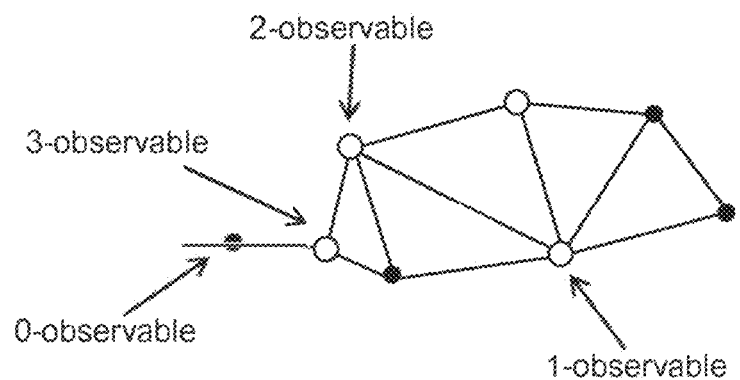

FIG. 3 illustrates what it is meant by observable or unobservable node. A node is termed k-observable (i.e. degree of observability k) if there exists a sub-network of observable nodes containing it and included in the sub-network of the neighborhood of n with k hops.

The node will be termed 0-observable, with k=0, if and only if the node is an anchor, that is to say that the node has its own position estimation at its disposal, for example with the aid of a GPS sensor, The node will be termed 1-observable, with k=1, if and only if the node can be geolocated on the basis of its direct neighbors (node positioned one hop from the current node) and of the optional measurements of ranging between the neighbors themselves, The node will be termed k-observable, with k>1, if and only if the node is observable (i.e. geolocatable) within its k-hops neighborhood, by utilizing the measurements of positions and ranging of the nodes of this neighborhood.

Figure 4:
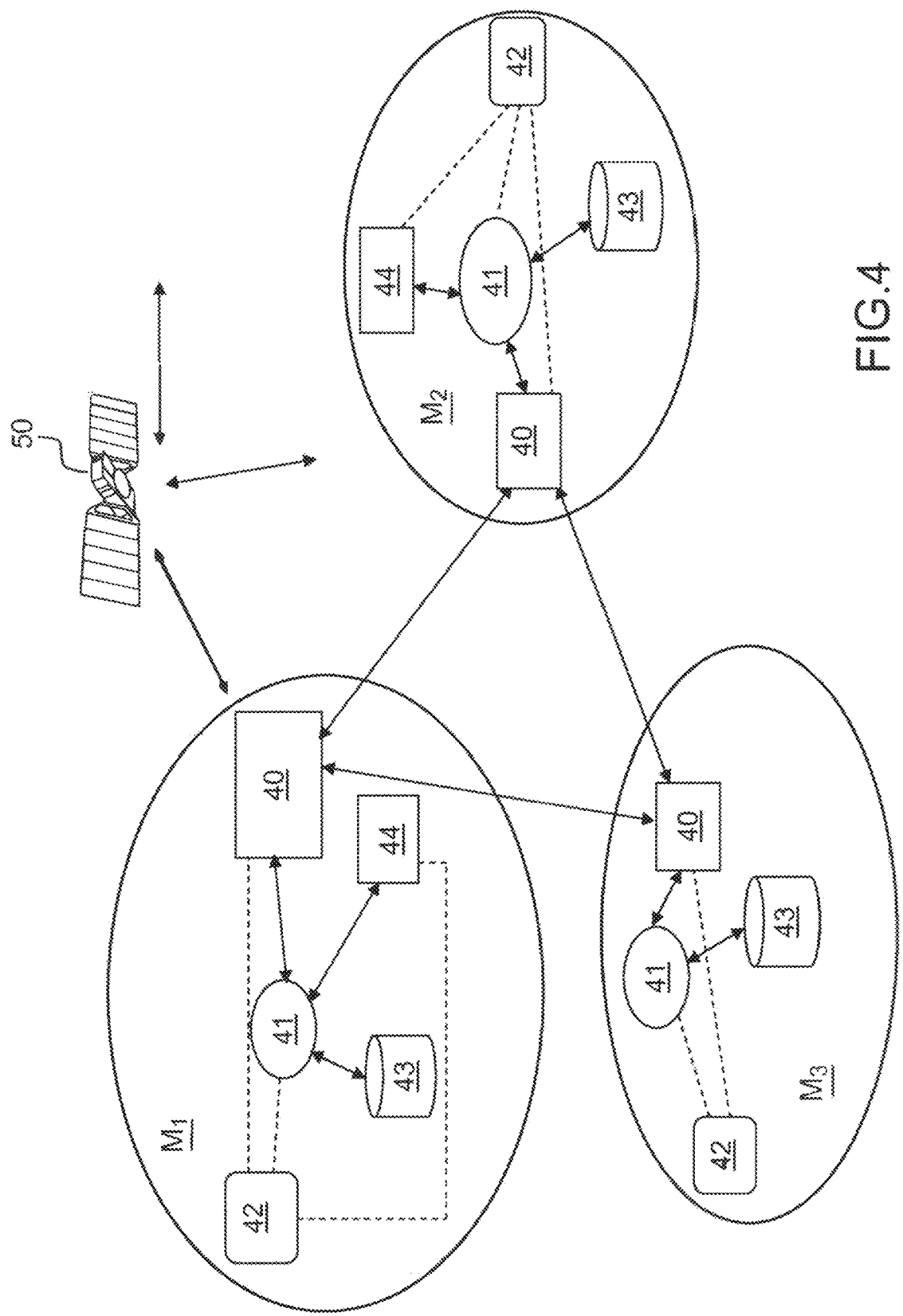

In order to better elucidate the method according to the invention, the example which follows is given in the case of a communication system comprising several nodes Mi. FIG. 4 shows diagrammatically a part of the communication network comprising the Mi nodes and the modules with which these nodes are equipped. The method in this example is implemented in a decentralized manner, that is to say that each node is autonomous and equipped with measurement means for geolocation, each node is capable of estimating its own position in a unique manner, and with communication means for exchanging information with the other nodes of the network, which are known to the person skilled in the art.

A node comprises, for example, a communication device 40, a processor 41 adapted to execute the steps of the method according to the invention and a battery 42 or power supply device. The nodes Mi communicate with one another, for example, by means of a wireless radiofrequency link or by other means known to the person skilled in the art. Each node also comprises a memory or table of neighbors 43 making it possible to store the position information in respect of the other nodes and to have an image of the topology of the nodes of the network.

The communication network also comprises a device for determining the absolute position of all or some of the nodes. Thus, all the nodes or some of the nodes may, for example, be equipped with a receiver 44 which, coupled with a satellite device 50, allows the node equipped with the receiver 44 to self-geolocate. This device for position measurements can be a GPS (Global Positioning System) geolocation system, a GNSS (Global Navigation Satellite System) satellite navigation system, a topography means, etc. In FIG. 4, the node $M_2$ is equipped with a receiver, whilst the node $M_3$ is not.

It also comprises a device for measurements of distance of its direct neighbors or ranging device, which is colocated. The ranging device can take the form of an electronic card carried by the node. According to another variant embodiment, this could be a functionality of the communication system at the level of a node measuring the time taken by the radio wave to travel between the nodes.

Figure 5:
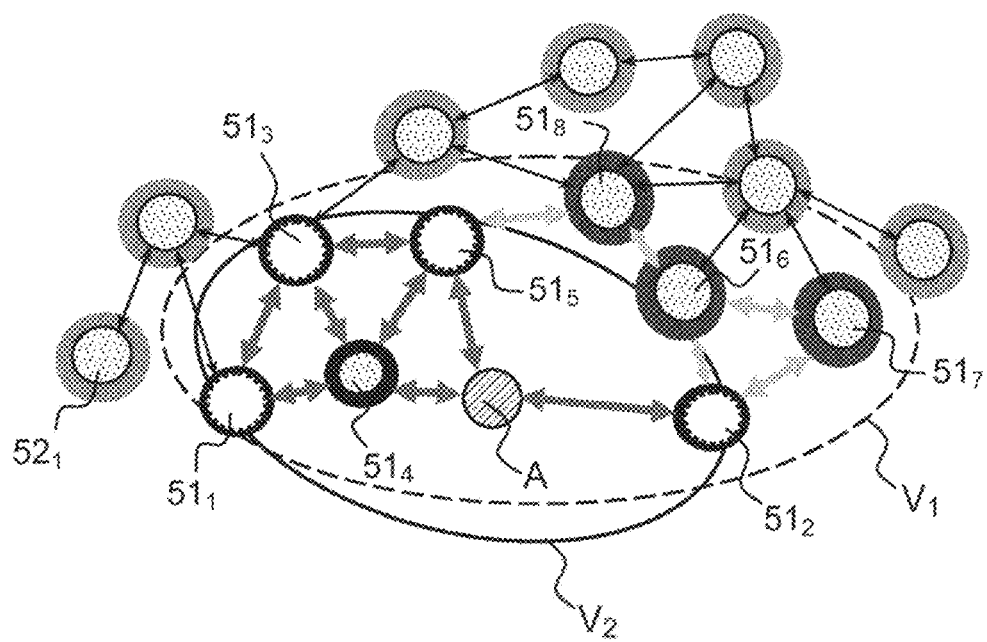

FIG. 5 illustrates the two steps of the method according to the invention which make it possible to define a subset of nodes, on the basis of which a geolocation method will be executed. The method calls upon the notion of oriented graph G known to the person skilled in the art. The graph is defined by a set of pairs (S, B) with S a finite set of vertices and B a set of pair of vertices corresponding to the nodes of the network.

The node A is a node to be geolocated and comprises the various items of equipment of a node described in FIG. 4. The nodes 51*i* are nodes, represented dashed in the figure, which comprise a position estimation. The nodes 52*j* are nodes, represented solid in the figure, which do not comprise any position estimation.

Each node knows the ranging topology of the network. Here this entails the telemetry topology for which two nodes i and j are joined by an oriented edge (i,j), if i has at its disposal a relative measurement of the distance of j. When the telemetry system is integrated with a radiocommunication network of MANET (Mobile ad hoc networks) type, the topology is the topology of a radiocommunication network.

A geolocation cycle is for example triggered at the level of each of the nodes according to a period T, every T seconds or minutes depending on the application.

The example which follows will be given within the framework of a decentralized architecture in which each node will try to self-geolocate by implementing the method over its neighborhood, i.e., the nodes in its neighborhood. The steps executed are then the following:
First step, Step 1: at a given instant to, the N-hops neighborhood of the current node A is determined, with N greater than or equal to 0, the number N is for example defined by taking account of the duration T of the geolocation cycle, so that the method has time to use the information transmitted by the neighbor nodes which are at most N hops away; the neighborhood constitutes a first sub-graph $V_1$,
Second step, Step 2: on the basis of the set of N-hops neighbors which was defined in the first step, the method determines the largest observable sub-graph $V_2$ of the N-hops neighborhood:
    containing at least the node A,
    in which at least three nodes (vertices) $M_1$, $M_2$, $M_3$ of the sub-graph $V_2$ have a position estimation at their disposal,
    which satisfies the property of being globally rigid according to the definition known to the person skilled in the art, i.e., 3-connected and redundant-rigid sub-graph,
Third step. Step 3: the method implements a conventional geolocation method on the set of nodes which are contained in the largest sub-graph.

Figure 6:
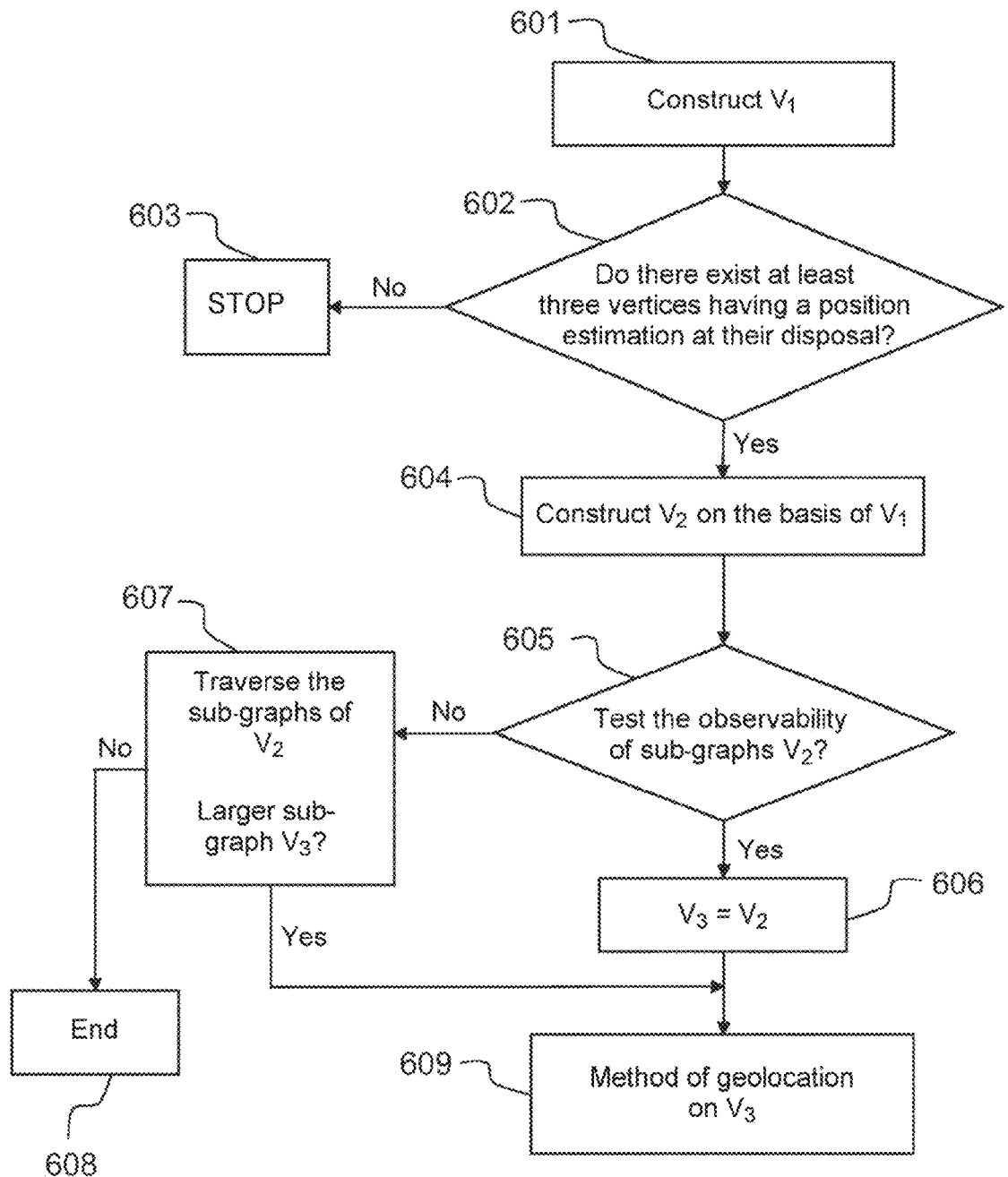

FIG. 6 illustrates in detail a flowchart of the steps implemented by the method according to the invention:
601—a set $V_1$ or first sub-graph of the neighbor nodes of the current node A in N hops maximum (N>=0) is determined, by using methods known to the person skilled in the art and based, for example, on protocols for exchanging tables of neighbors; The radius N must be chosen as large as possible while satisfying the following two constraints in a location refreshing cycle: the data exchange protocol and the radio network must make it possible to collect and forward all the sets of data and measurements of the nodes of the sub-graph $V_1$, a node must have sufficient processing capacity to process the data collected and to calculate its position",
602—A test is carried out to ascertain whether there exist at least three nodes belonging to the first sub-graph $V_1$ and having a position estimation at their disposal,
    If there do not exist at least three nodes belonging to the first sub-graph $V_1$ and having a position estimation at their disposal, then there is no observable neighborhood of the node A included in the sub-graph $V_1$ and the method stops, it is not possible to locate the node A, 603,
    If there are at least three nodes belonging to the sub-graph $V_1$ with position estimation, then we pass to the following step to find an observable sub-graph.

The largest observable sub-graph $V_3$ is determined on the basis of the subset of neighbors $V_1$ containing the node A, by executing for example the following steps:
604—A second sub-graph $V_2$ is constructed by eliminating from the first sub-graph $V_1$ the nodes which are different from the node A, which do not contain any position estimation and which are of degree less than or equal to 2 (corresponding to the number of edges which depart from a node), thereby making it possible to preserve just the nodes which will serve for the location algorithm,
605—A test is carried out to ascertain whether the second sub-graph $V_2$ is observable, by using for example a global-rigidity test known to the person skilled in the art,
    If the second sub-graph $V_2$ is observable, then the largest sub-graph $V_3$ is equal to the sub-graph $V_2$, 606, and we go to the geolocation step,
    Otherwise, 607, the method traverses all the sub-graphs of $V_2$ while searching for the largest observable sub-graph $V_3$ containing the node A, that is to say the sub-graph containing the most nodes capable of estimating their position in a unique manner, said nodes communicating with the node to be geolocated by broadcasting position and/or ranging information so as to geolocate a node. This traversal may be exhaustive, but it may be optimized to avoid traversing the totality of the sub-graphs of $V_2$, for example by traversing the sub-graphs by decreasing size (i.e. number of vertices) and by stopping as soon as an observable sub-graph which contains the node A is observed.

If no observable sub-graph containing the node A is found, there is no observable neighborhood of the node A included in the first sub-graph $V_1$ and the method terminates, 608, If a sub-graph is observable then $V_3$ exists, and we go to the geolocation step, 609,

609—A geolocation algorithm is executed on the nodes contained in the largest sub-graph $V_3$, so as to determine the position of the current node A.

An observability criterion for a two-dimensional graph can rely on the use of Aspnes' theorem known to the person skilled in the art, comprising the verification of the existence of at least three anchors in the graph (nodes having at their disposal an estimation of their inherent absolute position) and the verification of the globally rigid character of the graph.

The global-rigidity test can be carried out by executing the following steps known to the person skilled in the art:
Verify that the sub-graph is 3-connected, i.e., the graph remains connected on removing any two vertices,
Verify that the sub-graph exhibits a rigid redundancy (the sub-graph remains rigid on removing any edge; the rigidity may for example be verified using the Laman's theorem) and for example the "pebble game" algorithm known to the person skilled in the art.

The method described hereinabove can be used in a mobile communication network of ad-hoc type.

Advantages

The method offers a method of collaborative geolocation in constrained time in large networks, for a number at least equal to ten of communication nodes. This makes it possible notably to obtain a solution in constrained time and with a better geolocation precision than the precision obtained by prior art methods.

The invention claimed is:

1. A method of collaborative geolocation of one or more nodes Mi in a communication network, the nodes interexchanging distance and/or position information, comprising at least the following steps:
determine a first sub-graph $V_1$ of neighbor nodes of a current node A to be geolocated, in N hops,
select in said first sub-graph $V_1$, the largest observable sub-graph $V_3$ comprising the current node A, an observable sub-graph being a globally rigid sub-graph composed of a set of at least three nodes having a position estimation at their disposal, the nodes of sub-graph $V_3$ being configured to exchange position and/or ranging information, and
execute a geolocation algorithm on the nodes of the largest observable sub-graph $V_3$ to determine at least the position of the current node A.

2. The geolocation method as claimed in claim 1, further comprising at least the following steps:
determine a first sub-graph $V_1$ of the neighbor nodes of the current node A by considering the nodes in N hops maximum with N greater than or equal to zero, and then determine the largest observable sub-graph $V_3$ on the basis of the first sub-graph of the neighbors $V_1$ containing the node A, by executing the following steps:
determine whether there exist at least three nodes belonging to the first sub-graph $V_1$ and having a position estimation at their disposal,
if there do not exist at least three nodes belonging to the first sub-graph $V_1$ and having a position estimation at their disposal, then there is no observable neighborhood of the node A included in the first sub-graph $V_1$ and the node A is not locatable,
if there are at least three nodes belonging to the first sub-graph $V_1$ with position estimation, then, a second sub-graph $V_2$ is constructed, by eliminating from the first sub-graph $V_1$ the nodes which are different from the node A, which do not contain any position estimation and which have a number less than or equal to 2 of edges departing from the node,
test whether the second sub-graph $V_2$ is observable, if such is the case define the largest sub-graph $V_3$ as being the second sub-graph $V_2$, otherwise traverse the sub-graphs of $V_2$ containing the node A
execute a geolocation algorithm on the nodes contained in the largest sub-graph $V_3$ existing, so as to determine the position of the current node A.

3. The method as claimed in claim 2, wherein the observability test of a sub-graph implements a global-rigidity test.

4. The method as claimed in claim 3, wherein the global-rigidity test comprises the following steps:
verify that a sub-graph remains connected when any two vertices are removed,
verify that a sub-graph remains rigid on removing any edge.

5. The method as claimed claim 1, wherein the network is a decentralized communication network and the position of the nodes of said network is determined.

6. A device for geolocating one or more nodes in a network, the nodes being equipped with senders-receivers and with communication means,
wherein each of the nodes comprises at least the following elements:
a processor adapted to execute the steps of the method as claimed in claim 1,
a device allowing a node to self-geolocate,
a table storing the topology information in respect of the other nodes.

7. The device as claimed in claim 6, wherein the network is an ad-hoc communication network.

8. The method as claimed in claim 2, wherein the network is a decentralized communication network and the position of the nodes of said network is determined.

9. A device for geolocating one or more nodes in a network, the nodes being equipped with senders-receivers and with communication means, wherein each of the nodes comprises at least the following elements:
a processor adapted to execute the steps of the method as claimed in claim 2,
a device allowing a node to self-geolocate,
a table storing the topology information in respect of the other nodes.

10. The device as claimed in claim 9, wherein the network is an ad-hoc communication network.

* * * * *